(12) United States Patent
Schlueter et al.

(10) Patent No.: US 7,993,514 B2
(45) Date of Patent: Aug. 9, 2011

(54) REMOVAL OF PEROXIDE IMPURITIES FROM NAPHTHA STREAM

(75) Inventors: William D. Schlueter, Des Plaines, IL (US); Julian A. Vickers, Des Plaines, IL (US); Gail L. Grady, Des Plaines, IL (US)

(73) Assignee: UOP LLC, Des Plaines, IL (US)

( * ) Notice: Subject to any disclaimer, the term of this patent is extended or adjusted under 35 U.S.C. 154(b) by 260 days.

(21) Appl. No.: 12/021,047

(22) Filed: Jan. 28, 2008

(65) Prior Publication Data

US 2009/0188839 A1    Jul. 30, 2009

(51) Int. Cl.
*C10G 29/04* (2006.01)
*C10G 29/00* (2006.01)

(52) U.S. Cl. ........ 208/255; 208/295; 208/299; 208/257; 208/260

(58) Field of Classification Search .................... 208/299
See application file for complete search history.

(56) References Cited

U.S. PATENT DOCUMENTS

| | | | |
|---|---|---|---|
| 2,542,471 A * | 2/1951 | Brandon | 208/264 |
| 2,804,376 A * | 8/1957 | Haller et al. | 423/590 |
| 3,442,767 A * | 5/1969 | Hall | 208/349 |
| 4,174,353 A | 11/1979 | Marcinkowsky et al. | |
| 5,124,492 A | 6/1992 | Jan et al. | |
| 5,185,480 A * | 2/1993 | Sanderson et al. | 568/913 |
| 5,196,603 A | 3/1993 | Jan et al. | |
| 6,755,979 B2 * | 6/2004 | Williams et al. | 210/750 |

OTHER PUBLICATIONS

Arthur L. Kohl, "Stripping (chemical engineering)", in AccessScience@McGraw-Hill, http://www.accessscience.com, DOI 10.1036/1097-8542.660700.*
Donald F. Othmer, "Fluidization", in AccessScience@McGraw-Hill, http://www.accessscience.com, DOI 10.1036/1097-8542.262600.*
Raymond F. Fremed, "Heat exchanger", in AccessScience@McGraw-Hill, http://www.accessscience.com, DOI 10.1036/1097-8542.310700.*
Perry, R.H.; Green, D.W. (1997). Perry's Chemical Engineers' Handbook (7th Edition).. McGraw-Hill. Online version available at: http://knovel.com/web/portal/browse/display?_EXT_KNOVEL_DISPLAY_bookid=48&VerticalID=0.*

* cited by examiner

*Primary Examiner* — Glenn A Caldarola
*Assistant Examiner* — Michelle L Stein
(74) *Attorney, Agent, or Firm* — James C Paschall

(57) ABSTRACT

A method and apparatus for removing peroxides from an exposed naphtha stream is shown and described. The process includes the catalytic reactive oxygen stripping of peroxides thereby generating hydrocarbons and oxygen. Numerous conventional catalysts may be employed. The catalytic stripping reaction can be carried out at substantially lower temperatures than conventional reboiled oxygen strippers thereby resulting in substantial energy savings. Further, the disclosed reactor vessels are substantially smaller and less expensive to build than conventional oxygen stripper columns The disclosed energy efficient reactive oxygen stripping process and equipment is intended to be utilized upstream of a naphtha hydrotreating unit.

18 Claims, 2 Drawing Sheets

REMOVAL OF PEROXIDE IMPURITIES FROM NAPHTHA STREAM

BACKGROUND

1. Technical Field

This disclosure relates to the removal of peroxides from a naphtha stream or supply that has been exposed to oxygen. When exposed to oxygen, naphtha compounds can form peroxides which readily decompose to free radicals. This disclosure provides a reactor and a method for the catalytic conversion of such peroxides to useful hydrocarbons and oxygen which can be used to replace a conventional oxygen stripper column and conventional oxygen stripping method.

2. Description of the Related Art

Naphtha ($C_6$-$C_{10}$ hydrocarbons) is generated from the distillation of petroleum as well as coal, tar and shale oil and is a primary constituent of gasoline. Prior to being incorporated into a gasoline formulation, naphtha is typically hydrotreated or hydrodesulfurized.

Hydrotreating or hydrodesulfurization (HDS) is a common process to remove contaminates such as sulfur, hydrogen, condensed ring aromatics and/or metals in a catalytic process. However, prior to passing naphtha through a hydrotreating unit, naphtha often comes into contact with oxygen, either in storage or during transit. The oxygen reacts with naphtha to form peroxides, which readily decompose into free radicals. Once decomposed, the free radicals initiate the formation of oligomers (gums), which can result in fouling of the hydrotreating process unit.

Currently, such peroxides can be removed from a naphtha stream using a reboiled oxygen stripper column. The bottoms temperature of a conventional reboiled oxygen stripper column must be maintained at or above 176° C. (350° F.) to insure complete thermal decomposition of the peroxides. Thus, these conventional oxygen stripper columns have substantial energy consumption and therefore high operating costs. For example, a 28,750 BPSD oxygen stripper column requires approximately over $1.5 million in high-pressure steam per year to operate. Further, conventional oxygen stripper columns are relatively wide and therefore expensive to construct and consume a substantial footprint. For example, a typical oxygen stripper column and related equipment are very costly to construct.

As a result, some refiners bypass the oxygen stripping process altogether thereby adversely affecting the downstream naphtha hydrotreating unit. Specifically, some refiners consider it to be less expensive to incur the additional downtime for purposes of unfouling the naphtha hydrotreating unit rather than investing in an oxygen stripper column and incurring the additional capital and operating costs.

Therefore, there is a substantial need for an improved oxygen stripping process and equipment for naphtha streams that may be inexpensively incorporated into a refining process upstream of a naphtha hydrotreating unit.

SUMMARY OF THE DISCLOSURE

In satisfaction of the aforenoted need, an improved oxygen stripper process and reactor is provided for efficiently decomposing peroxides found in naphtha streams that have been exposed to air or oxygen. As noted above, conventional processes rely upon the following thermal decomposition:

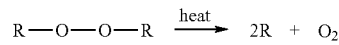

which requires a reaction temperature of at least 176° C. (350° F.).

To reduce the energy consumption required by the above endothermic reaction, disclosed herein is a catalytic reactive oxygen stripping process as follows:

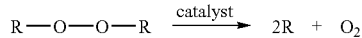

which requires a reaction temperature below 176° C. (350° F.), thereby reducing energy consumption.

In the disclosed process, a reactor is provided. The "exposed" naphtha stream that comprises as least some peroxides is delivered to one end of the reactor column. The reactor column houses a catalyst bed disposed between the opposing ends of the column. The naphtha stream needs to be heated, but only to a temperature of less than 350° F. in contrast to the higher utility requirements of conventional processes. As the naphtha stream passes through the catalyst bed, the catalytic conversion of the peroxides to hydrocarbons and oxygen takes place and the stripped naphtha and resulting oxygen is removed from the reactor.

Numerous catalysts will work in the oxygen stripping process. Essentially, numerous aluminum based catalysts with an additional metal or metal atoms such as iron, titanium, platinum, copper, nickel and molybdenum can be used. Similarly, zeolite catalysts with any of the above metal atoms can be utilized. Iron-zeolite and iron-alumina catalysts may be preferable because of their low cost.

In an embodiment, the exposed naphtha feed stream that is delivered to the reactor is heated in a first heat exchanger by the stripped naphtha stream taken off from the reactor and then the exposed naphtha feed is heated in a second heat exchanger or feed heater. The second heat exchanger may be driven by steam, electricity, natural gas or other convenient utility source. Again, the naphtha feed stream does not need to be heated to a conventional oxygen stripping process temperature; temperatures of less than 177° C. (350° F.) are intended to be employed. While temperatures anywhere in the range of from about 90° C. to less than 177° C. (~194° F. to less than 350° F.) can be employed, naphtha feed stream temperatures in the range of from about 90° C. to about 163° C. (~194° F.-~325° F.) will be effective, more preferably in the range of from about 90° C. to about 149° C. (~194° F.-~300° F.) Reaction temperatures below 93° C. (200° F.) and as low as 90° C. (~194° F.) are anticipated.

In one embodiment the reactor has a single outlet and the stripped naphtha and oxygen are passed to a receiver where the oxygen, other gases and any water present are removed from the stripped naphtha stream.

In another embodiment, as the naphtha stream passes through the catalyst bed, a counter-current stream of gas passes through the catalyst bed which helps to entrain the released oxygen produced by the oxygen stripping reaction described above. Thus, the exposed naphtha stream passes through the reactor in one direction and a gas stream passes through the reactor and catalyst bed in an opposite direction to remove the produced oxygen and, perhaps water vapor, if present.

In an embodiment, the gas stream is nitrogen which relatively inert and provides a convenient means for removing the produced oxygen. Preferably, the nitrogen stream is heated before it is injected into the reactor thereby avoiding any quenching of the catalytic oxygen stripping reaction taking place in the catalyst bed.

In a refinement of this concept, the gas stream that is removed from the reactor is cooled thereby allowing any water and naphtha vapor contained in the gas stream to condense. Preferably, any condensed naphtha is then returned to this process and reintroduced into the column with the exposed naphtha feed.

In another refinement, the exposed naphtha feed and, preferably any condensed naphtha from the gas stream, is passed through a receiver to remove or "knock out" any water prior to delivering the naphtha stream to the reactor.

Further, in addition to the catalyst bed, the reactor may include a plurality of contacting trays disposed below the bed. Typically, the need for contacting trays is reduced to fifteen or less.

As an alternative, hydrogen can be employed for the gas stream instead of nitrogen. Combinations of hydrogen and nitrogen may also be employed. On one hand, hydrogen is advantageous because it helps reduce the presence of oligomer or gummy reaction products. On the other hand, nitrogen reduces the explosivity potential of the process If hydrogen is used as the feed gas stream to the reactor, nitrogen may be injected after the gas stream is taken off of the reactor and cooled to the keep the receiver, if utilized, well within the acceptable gas explosivity limit.

Because exposed naphtha will typically include some water as well as peroxides, it is preferred that the exposed naphtha feed stream be passed through a receiver to remove any free water prior to introduction into the reactor. Thus, the receiver provides a convenient place to combine any condensed naphtha vapor from the gas stream with the exposed naphtha feed.

Other advantages and features will be apparent from the following detailed description when read in conjunction with the attached drawings.

BRIEF DESCRIPTION OF THE DRAWING

For a more complete understanding of the disclosed methods and apparatuses, reference should be made to the embodiments illustrated in greater detail in FIGS. 1 and 2, which are schematic illustrations disclosed processes and apparatuses for removing peroxides from a naphtha stream.

DETAILED DESCRIPTION OF THE PRESENTLY PREFERRED EMBODIMENTS

Figure 1:
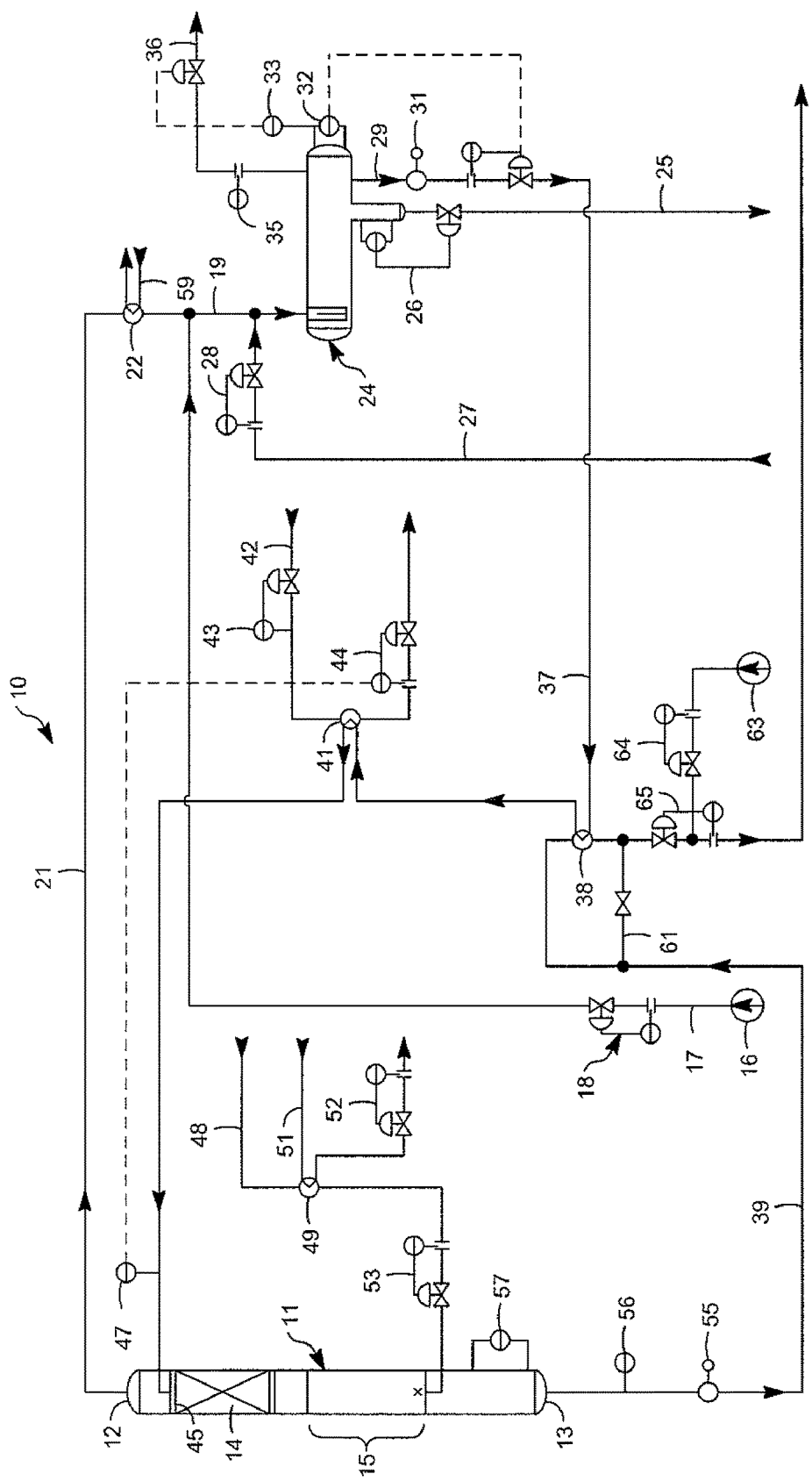
Figure 2:
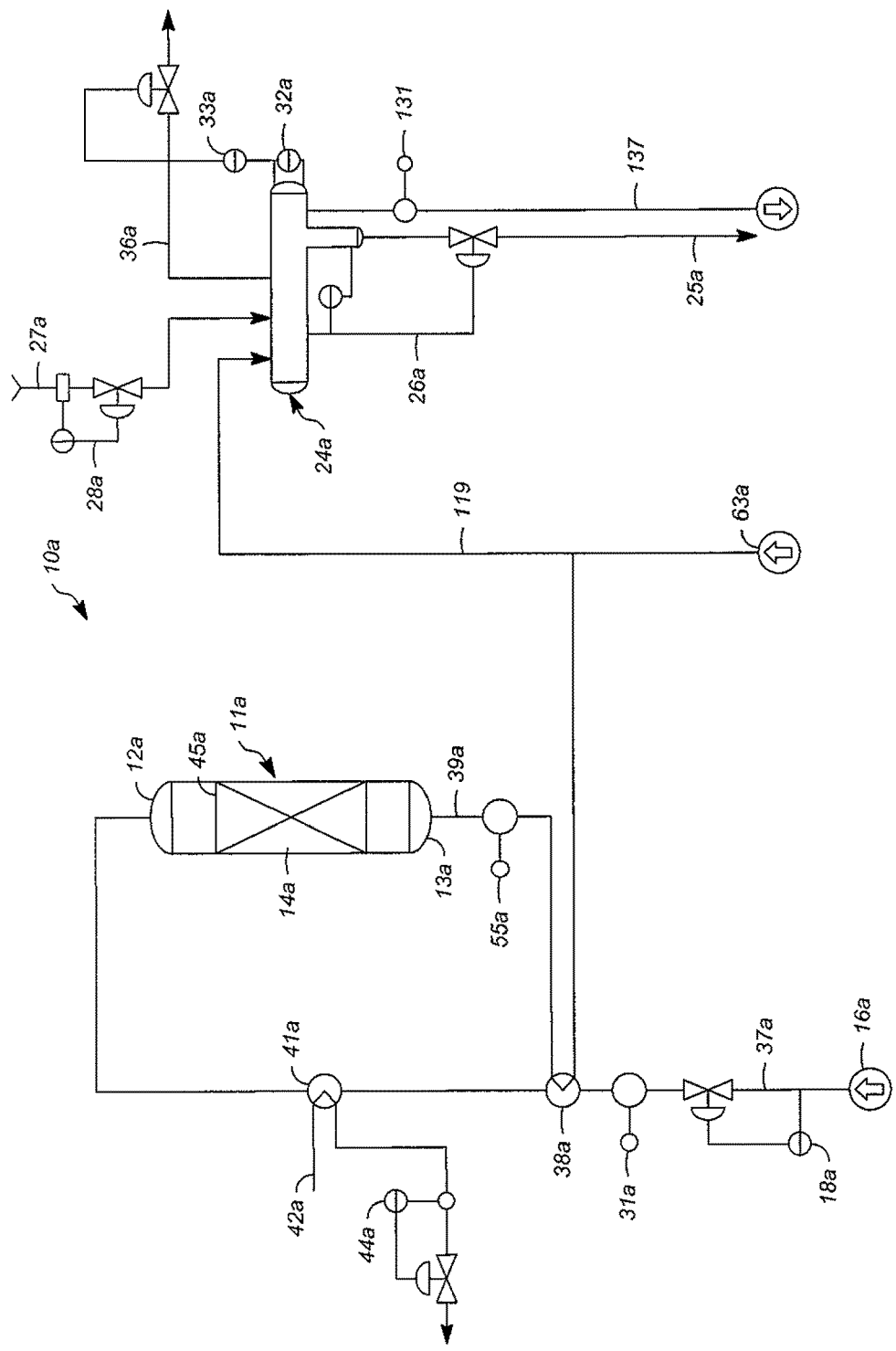

Turning to FIG. 1, system 10 includes a reactor 11 with a top 12, a bottom 13 and a catalyst bed 14 disposed between the top 12 and bottom 13 of the reactor 11. The reactor vessel 11 may optionally accommodate a plurality of contacting trays shown schematically at 15. In previous oxygen stripping processes, at least fifteen contacting trays or more were generally needed. In the present process, less than fifteen trays are required and typically only several trays. Further, the embodiment of FIG. 2 is operated without contacting trays.

Exposed or straight run naphtha is delivered to the system 10 from the supply 16 where the naphtha enters the line 17 and passes through a flow rate controller (FRC) 18. The exposed naphtha feed in the line 17 is then combined in the line 19 with gas exiting the top 12 of the reactor 11 through the overhead line 21. The overhead gas stream that passes through the line 21 is first cooled through the cooler or condenser 22 before it is combined with the exposed naphtha feed in the line 19. The combined stream in the line 19 is then passed through a column overhead receiver 24 which knocks out any water in the combined stream through the line 25. The water could originate from partially saturated naphtha or possibly even some free water mixed in with the naphtha from storage. The water passes out of the receiver through the line 25 after it passes through the level indicator controller (LIC) 26. Optionally, purge gas from nitrogen header can be introduced through the line 27 and FRC 28 upstream of the overhead receiver 24 to keep the receiver 24 well below the explosivity point. This option is particularly useful if hydrogen is used as the counter-current gas stream in the column 11 as opposed to nitrogen. The pressure in the column overhead receiver 24 is preferably controlled by regulating the amount of column off-gas released through the line 36. A flow indicator is shown at 35. The off-gas stream exits the receiver 24 through the line 36 and preferably passes to a scavenger gas header (not shown).

The exposed naphtha feed and any condensed naphtha vapor from the gas stream exiting the top 12 of the reactor 11 passes out of the receiver 24 through the line 29. The exposed naphtha feed is delivered to the top 12 of the reactor 11 by the oxygen stripper pump 31. A LIC 32 as well as a pressure recording controller (PRC) 33 may be employed at the receiver 24.

The naphtha feed passing through the oxygen stripper overhead pump 31 and through the line 37 passes through the heat exchanger 38 where is heated by the stripped naphtha bottoms stream passing through the line 39. The naphtha feed is then heated again in the second or feed heat exchanger 41 which may be driven by any conventional means such as steam, electricity, natural gas, etc. In the embodiment illustrated in FIG. 1, steam is provided through the line 42 with a pressure indicator controller (PIC) 43 and FRC 44. The heated exposed naphtha feed stream (which may also include reclaimed condensed naphtha vapors from the line 21) then enters the reactor 11 from the top 12. Preferably, a distributor is employed as illustrated at 45. Conventional distributors including one or more nozzles may be used. A temperature recording controller (TRC) is shown at 47 which is linked to the steam FRC 44.

The exposed naphtha feed passes through the distributor and down the catalyst bed 14 where peroxides are converted. In the system 10 of FIG. 1, gas may be introduced below the catalyst bed through the line 48. If used, the gas passes counter-currently to the naphtha feed upward through the bed 14. The gas, as discussed above, may be nitrogen or hydrogen or a combination of the two. When counter-current gas is used, it is preferably heated through the exchanger 49 which may be driven by any conventional means, such as steam, through the line 51. A steam or condensate FRC is shown at 52. An additional FRC is shown at 53 to control the rate of gas flowing through the line 48 to the reactor 11. Preferably, when utilized, the gas is introduced to the reactor 11 below the catalyst bed 14 to remove oxygen produced by the catalytic conversion of peroxides to paraffins and, if contacting plates 15 are employed, below the contacting plates 15. Again, the number of the optional contacting plates will range anywhere from a few to several and less than the conventional number, which is typically fifteen or more.

Another option instead of using a counter-current gas flow through the line 48 and upward through the column 11 is to simply remove the stripped naphtha stream from the column and remove any oxygen and water from the stripped naphtha stream in a receiver as explained below in connection with FIG. 2.

Still referring to FIG. 1, after the exposed naphtha passes through the distributor 45, the catalyst bed 14 and the contacting plates 15, the stripped naphtha stream passes out of the reactor 11 through the bottom 13 of the column 11 through the bottoms line 39. A bottoms pump is shown at 55. A temperature indicator is shown at 56 and a level recorder is shown at 57. Obviously, the control elements can be varied and other arrangements will be apparent to those skilled in the art.

For economy's sake, the cooler or condenser 22 is preferably driven by cooling water passing through the line 59 or possibly by air, depending upon the reaction temperature within the reactor 11. Optionally, an additional line 61 may pass on either side of the heat exchanger 38, but will typically not be utilized. Stripped naphtha passes through the line 39 and exchanger 38 may also be combined with another source of peroxide-free naphtha such as coker naphtha provided at 63 with FRCs shown at 64 and 65. Thus, the system of FIG. 1 provides a reactive stripper 11 that operates at a lower temperature, and therefore more economically, than conventional reboiled oxygen stripper column. Economical catalysts, such as various zeolites including iron-zeolites or various alumina catalysts such as iron-alumina, may be utilized. As shown below, the system 10 will certainly be more attractive to refiners than a conventional reboiled oxygen strippers or the alternative of not stripping peroxides from exposed naphtha streams at all.

Turning to FIG. 2, system 10a includes a reactor 11a with a top 12a, a bottom 13a and a catalyst bed 14a disposed between the top 12a and bottom 13a of the reactor 11a. Exposed or straight run naphtha is delivered to the system 10a at 16a where the naphtha enters the line 37a and passes through a flow rate controller (FRC) 18a. The exposed naphtha feed in the line 37a is delivered to the top 12a of the reactor 11a by a pump 31a after it is heated in the bottoms heat exchanger 38a and the feed heat exchanger 41a to a temperature of about 93° C. (~194° F.) or other suitable reaction temperature, depending upon the particular catalyst chosen. Again, reaction temperatures and pressures may vary Steam to heat the feed 37a may be provided through the line 42a that is equipped with a FRC at 44a. The heated exposed naphtha feed stream then enters the reactor 11a from the top 12a. A distributor may be employed as illustrated at 45a.

The exposed naphtha feed passes through the distributor 45a and down the catalyst bed 14a. The stripped naphtha is removed from the reactor 11a and oxygen and water are removed from the stripped naphtha stream in the receiver 24a.

Still referring to FIG. 2, after the exposed naphtha passes through the distributor 45a and the catalyst bed 14a, the stripped naphtha stream passes out of the reactor 11a through the bottom 13a of the reactor 11a through the bottoms line 39a. It will be noted that the reactor 11a of FIG. 2 is substantially smaller than the columns 11 of FIG. 1 as the contacting plates 15 and the counter-current gas flow are not utilized. A bottoms pump is shown at 55a which passes the hot stripped naphtha passes through the bottoms exchanger 38a and to the receiver 24a where the oxygen product of the stripping reaction and any water are removed. The stripped naphtha may also be combined upstream of the receiver 24a with another source of peroxide-free naphtha such as coker naphtha provided at 63a. Off-gas is removed from the receiver 24a through the line 36a and purge or blanket gas is delivered to the receiver 24a through the line 27a. Nitrogen may be used as the purge gas or, if the system operates safely within the explosivity limits, fuel gas or hydrogen may be used to maintain the pressure within the receiver 24a as either a purge gas or blanket gas.

Thus, the systems 10, 10a of FIGS. 1 and 2 provide catalytic strippers 11, 11a that operate at a lower temperature, and therefore are more economical, than a conventional reboiled oxygen stripper column. Economical catalysts, such as various zeolites including iron-zeolites or various alumina catalysts such as iron-alumina, may be utilized. As shown below, the systems 10, 10a will be more attractive to refiners than conventional reboiled oxygen strippers or the alternative of not stripping peroxides from exposed naphtha streams at all. Because a bottoms reboiler is not required and because of the substantially lower reaction temperatures, it is anticipated that the systems 10, 10a of FIGS. 1 and 2 will reduce utility consumption by 60% or more for a 28,750 BPSD (barrels per stream day) unit. Further, because both systems 10, 10a use reactors 11, 11a that are smaller than a conventional stripper column, do not use a bottoms reboiler, an overhead condenser or reflux pump, it is estimated that the disclosed systems include equipment costs that are at least 20% less than a conventional oxygen stripper system.

While only certain embodiments have been set forth, alternatives and modifications will be apparent from the above description to those skilled in the art. These and other alternatives are considered equivalents and within the spirit and scope of this disclosure and the appended claims.

The invention claimed is:

1. A method of removing peroxide compounds from a naphtha stream, the method comprising:
   providing a reactor comprising a catalyst bed;
   delivering the naphtha stream comprising peroxide compounds at a temperature of less than 350° F. to the reactor;
   delivering a gas stream to the catalyst bed, the gas stream comprising nitrogen;
   passing the naphtha stream through the catalyst bed and catalytically stripping the peroxide compounds from the naphtha stream in the catalyst bed by converting the peroxide compounds to hydrocarbon compounds and oxygen;
   removing the stripped naphtha stream and oxygen from the reactor.

2. The method of claim 1 further comprising:
   separating the oxygen from the stripped naphtha stream in a receiver.

3. The method of claim 1 further comprising:
   wherein the naphtha stream comprising peroxide compounds is delivered to the reactor temperature ranging from about 90° C. to about 149° C.

4. The method of claim 1 further comprising:
   wherein the naphtha stream comprising peroxide compounds is delivered to the reactor temperature less than about 93° C.

5. The method of claim 1 further comprising:
   delivering said gas stream to the reactor below the catalyst bed;
   counter-currently passing the gas stream through the catalyst bed past the naphtha stream; and
   removing the gas stream from the reactor with the oxygen out one end of the reactor and removing the stripped naphtha stream out an opposing end of the reactor.

6. The method of claim 5 further comprising:
   heating the gas stream prior to delivering the gas stream to the reactor.

7. The method of claim 5 further comprising:
   condensing water and naphtha vapor from the removed gas stream by cooling the removed gas stream, combining the condensed naphtha with the naphtha stream comprising peroxide compounds to provide a combined naphtha stream that is delivered to the reactor.

8. The method of claim 7 further comprising:
passing the combined naphtha stream through a receiver to remove water prior to delivering the combined naphtha stream to the reactor.

9. The method of claim 1 wherein the reactor further comprises a plurality of contacting trays disposed below the catalyst bed.

10. The method of claim 9 wherein the plurality of trays is less than 15.

11. The method of claim 1 wherein the naphtha stream that is delivered to the reactor is heated in a first heat exchanger by the stripped naphtha stream removed from the reactor and is further heated in a second heat exchanger.

12. A method of removing peroxides from a naphtha stream, the method comprising:
providing a reactor comprising a top, a bottom and a catalyst bed disposed between the top and bottom of the reactor, catalyst in said catalyst bed comprising iron, titanium, copper, molybdenum on an alumina or a zeolite;
delivering a naphtha stream at a temperature of less than 350° F. to the top of the reactor;
passing the naphtha stream downward through the catalyst bed to catalytically strip the peroxides from the naphtha stream in the catalyst bed by converting the peroxides to hydrocarbon compounds;
removing the stripped naphtha stream from the bottom of the reactor.

13. The method of claim 12 further comprising:
separating an oxygen stream from the stripped naphtha stream in a receiver.

14. The method of claim 12 further comprising:
wherein the naphtha stream comprising peroxide compounds is delivered to the reactor temperature ranging from about 90° C. to about 149° C.

15. The method of claim 12 further comprising:
wherein the naphtha stream comprising peroxide compounds is delivered to the reactor temperature less than about 93° C.

16. The method of claim 12 further comprising:
delivering a gas stream to the reactor below the catalyst bed, the gas stream comprising hydrogen or nitrogen;
counter-currently passing the gas stream upward through the catalyst bed past the naphtha stream; and
removing the gas stream from the top of the reactor with the oxygen and removing the stripped naphtha stream out the bottom of the reactor.

17. The method of claim 16 further comprising:
heating the gas stream prior to delivering the gas stream to the reactor;
condensing water and naphtha vapor from the removed gas stream by cooling the removed gas stream,
combining the condensed naphtha with the naphtha stream comprising peroxide compounds to provide a combined naphtha stream;
passing the combined naphtha stream through a receiver to remove water prior to delivering the combined naphtha stream to the top of the reactor.

18. The method of claim 12 wherein the naphtha stream that is delivered to the top of the reactor is heated in a first heat exchanger by the stripped naphtha stream removed from the bottom of the reactor followed by heating the naphtha stream in a second heat exchanger before the naphtha stream is delivered to the top of the reactor.

* * * * *